United States Patent [19]

Nelson et al.

[11] Patent Number: 5,067,538
[45] Date of Patent: Nov. 26, 1991

[54] DIMENSIONALLY STABLE POLYESTER YARN FOR HIGHLY DIMENSIONALLY STABLE TREATED CORDS AND COMPOSITE MATERIALS SUCH AS TIRES MADE THEREFROM

[75] Inventors: Charles J. Nelson, Chesterfield; Jayendra H. Bheda; Peter B. Rim, both of Midlothian, all of Va.; James M. Turner, Cary, N.C.

[73] Assignee: Allied-Signal, Morris Township, Morris County, N.J.

[21] Appl. No.: 263,756

[22] Filed: Oct. 28, 1988

[51] Int. Cl.$^5$ .................... D02G 3/48; B60C 9/00
[52] U.S. Cl. .................. 152/451; 57/902; 264/210.8; 264/211.12; 264/211.15; 428/364; 428/395
[58] Field of Search .......... 152/451, 527, 556; 264/211.12, 211.13, 211.14, 211.15, 210.8; 428/364, 395; 57/902

[56] References Cited

U.S. PATENT DOCUMENTS

| | | | |
|---|---|---|---|
| 4,101,525 | 7/1978 | Davis et al. | 528/309 |
| 4,491,657 | 1/1985 | Saito | 528/308.1 |
| 4,690,866 | 9/1987 | Kumakowa et al. | 428/364 |
| 4,827,999 | 5/1989 | Yabuki et al. | 152/451 |
| 4,975,326 | 12/1990 | Buyalos et al. | 57/902 X |

FOREIGN PATENT DOCUMENTS

EP-A-89912 9/1983 European Pat. Off. .
EP-A-0169415 1/1986 European Pat. Off. .
EP-A-0295147 12/1988 European Pat. Off. .

Primary Examiner—Michael W. Ball
Assistant Examiner—Adrienne C. Johnstone
Attorney, Agent, or Firm—William H. Thrower

[57] ABSTRACT

Polyethylene terephthalate yarn is prepared by spinning under very high-stress conditions wherein oriented-crystalline undrawn yarns are obtained. Selection of process parameters yields a partially oriented semicrystalline undrawn yarn with a crystallinity of 16 to 24 percent and a melting point elevation of 14° to 22° C. which is drawn to produce the resulting unique combination of properties: (A) a terminal modulus of at least 20 g/d, (B) a dimensional stability defined by $E_{4.5} + FS < 11.5$ percent, (C) a tenacity of at least 5 grams per denier, (D) a melting point elevation of 14° to 22° C., preferably 17° to 20° C., and (E) an amorphous orientation function of less than 0.75. The resulting treated tire cord unexpectedly provides high ultimate elongation and high toughness in combination with improved dimensional stability.

10 Claims, 5 Drawing Sheets

FIGURE 2

DIMENSIONALLY STABLE POLYESTER YARN FOR HIGHLY DIMENSIONALLY STABLE TREATED CORDS AND COMPOSITE MATERIALS SUCH AS TIRES MADE THEREFROM

BACKGROUND OF THE INVENTION

1. Field of the Invention

This invention relates to polyester multifilament yarn with high modulus and low shrinkage particularly useful for the textile reinforcement of tires. The yarn of the invention provides treated cords with the combination of exceptional dimensional stability and high ultimate elongation. A process for production of the multifilament polyester yarn is an aspect of the invention.

2. Description of the Prior Art

Polyethylene terephthalate filaments of high strength are well known in the art and are commonly utilized in industrial applications including tire cord for rubber reinforcement, conveyor belts, seat belts, V-belts and hosing.

Continued improvement in dimensional stability of polyester industrial yarns is desired to reduce tire sidewall indentations with current polyester monoply radial tires and to replace rayon in the bodies of radial tires and other reinforced industrial products. For the latter, the objective is to have strength and modulus equivalent to rayon at elevated tire service temperatures, while using up to 30 percent less material. While the current polyester cords have sufficient strength, their elevated temperature modulus is lower than desired for this application. U.S. Pat. No. 4,101,525 to Davis et al. provides a high strength multifilament polyester yarn with low shrinkage and work loss characteristics. Although Davis et al. does not provide treated cord data, yarns exhibiting the features taught by Davis do not meet the modulus requirements. Additionally, rapid cooling of the filament immediately after emerging from the spinneret can result in excessive filament breakage and thus yield yarn with poor mechanical quality. U.S. Pat. No. 4,491,657 to Saito et al. discloses high modulus, low shrinkage polyester yarn, but requires a low terminal modulus to achieve good yarn to treated cord conversion efficiency for such dimensionally stable yarns. The low terminal modulus is translated into the treated cord and results in a lower tenacity than the high terminal modulus cords of the present invention. Also, the process of Saito et al. requires high spinning speeds, which makes it difficult to incorporate this invention into a continuous spin-draw process.

U.S Pat. No. 4,690,866 to Kumakowa et al. describes a means of making yarns which yield highly dimensionally stable treated cords using ultra high viscosity polymer. On a comparative experimental basis, i.e. utilizing our solvent system, the Kumakowa intrinsic viscosity (IV) values would be 5% higher than indicated in their patent, i.e. they required a minimum of 0.95 IV polymer by our measurements. Also, these cords have low terminal modulus and hence do not achieve the full tenacity benefit of a given polymer viscosity.

SUMMARY OF THE INVENTION

Polyethylene terephthalate yarn can be prepared by spinning under very high-stress conditions wherein oriented-crystalline undrawn yarns are obtained. The invention is accomplished by selection of process parameters to form a partially oriented semicrystalline undrawn yarn with a crystallinity of 16 to 24 percent and a melting point elevation of 14° to 22° C. The spun yarn is then hot drawn to a total draw ratio between 1.2/1 and 2.5/1 with the resulting unique combination of properties: (A) a terminal modulus of at least 20 g/d, (B) a dimensional stability defined by $E_{4.5} + FS < 11.5$ percent, (C) a tenacity of at least 5 grams per denier, (D) a melting point elevation of 14° to 22° C., preferably 17° to 20° C., and (E) an amorphous orientation function of less than 0.75. The drawn yarn is twisted and plied to produce tire cord and then treated in accordance with conventional industry practice. The resulting treated tire cord unexpectedly provides high ultimate elongation and often high toughness in combination with greatly improved dimensional stability.

DESCRIPTION OF THE PREFERRED EMBODIMENT

The ultra dimensionally stable polyester multi-filament yarn of the present invention provides high ultimate elongation together with improved treated cord dimensional stability when incorporated as fibrous reinforcement into rubber composites such as tires.

With the current emphasis on effectively replacing rayon with polyester in monoply radial passenger tires, the demand for ever increasing dimensionally stable cords continues to be high. Dimensional stability is defined as high modulus at a given shrinkage and directly relates to tire sidewall indentations (SWI) and tire handling. While the modulus of the cord in the tire is the primary variable governing both SWI and handling, shrinkage is important in two ways. First, excessive cord shrinkage during tire curing can significantly reduce the modulus from that of the starting treated cord. Second, cord shrinkage is a potential source of tire non-uniformity. Thus, comparison of modulus and tenacity at a given shrinkage is a meaningful comparison for tire cords. Since tire cords experience deformations of a few percent during service, a good practical measure of modulus is LASE-5 (load at 5 percent elongation). Alternatively, $E_{4.5}$ (elongation 4.5 g/d load) can be used as a practical measure of compliance.

For both tire SWI and handling, modulus at elevated temperature (up to 110° C.) is the important parameter governing performance. Due to the highly crystalline nature of treated cords based on conventional or dimensionally stable yarns, the modulus retention (in percent) at elevated tire temperatures is essentially similar for all current commercial treated cords and for those of this invention when loss modulus peaks occur at 110° C. or greater. Thus, room temperature measurement of LASE-5 is sufficient to establish meaningful differences in polyester cord dimensional stability. At 110° C., these polyesters retain roughly 70 percent of their room temperature modulus. For comparative purposes, room temperature and 110° C. data is given below for typical rayon and commercial dimensionally stable polyester treated cords after conditioning at 23° C., 65% RH in the relaxed state.

|  | Rayon | | Dimensionally Stable Polyester | | | |
|---|---|---|---|---|---|---|
|  | RT | 110° C. | RT | 110° C. | RT | 110° C. |
| Tenacity (g/d) | 3.4 | — | 6.7 | — | 5.7 | — |
| Lase-5 (g/d) | 1.2 | 1.2 | 2.34 | 1.57* | 1.84 | 1.23* |
| Toughness (g/d) | 0.27 | — | 0.45 | — | 0.41 | — |
| Free Shrinkage % (at 177° C.) | 1 | | 4 | | 4 | |
| Construction | 1100/2 | | 1000/3 | | 1000/3 | |
| Twist | 14 × 14 | | 8 × 8 | | 10 × 10 | |

*Note % retained = 67%

The above 1100/2, 14×14 construction has a similar twist multiplier to the 1650/2, 12×12 rayon construction also commonly used. Hence both constructions have similar properties. In Europe, the polyester cords commonly used are 1000/2, 12×12 which, on a grams per denier basis, has similar properties to 1000/3, 10×10. The 1000/3, 8×8 represents the lowest known twist multiplier used in commercial tires. Lower PET twists than 8×8 are generally avoided due to fatigue life limitations.

Tires must be able to withstand sidewall "bruising", i.e., the breaking of body cords during direct impact on the sidewall. Cords with high elongation and toughness are necessary to impart this "bruise resistance". Some tire designs specify ultimate elongation (UE) of 15% or greater. One means of achieving higher UE is increasing twist, but the penalty is lower modulus and hence higher SWI levels. As a "rule-of-thumb", plots of UE versus modulus (e.g., LASE-5) are insensitive to cord twist level. Hence, one must change the base yarn to get higher UE at a given LASE.

The polyester yarn contains at least 90 mol percent polyethylene terephthalate (PET). In a preferred embodiment, the polyester is substantially all polyethylene terephthalate. Alternatively, the polyester may incorporate as copolymer units minor amounts of units derived from one or more ester-forming ingredients other than ethylene glycol and terephthalic acid or its derivatives. Illustrative examples of other ester-forming ingredients which may be copolymerized with the polyethylene terephthalate units include glycols such as diethylene glycol, trimethylene glycol, tetramethylene glycol, hexamethylene glycol, etc., and dicarboxylic acids such as isophthalic acid, hexahydroterephthalic acid, bibenzoic acid, adipic acid, sebacic acid, azelaic acid, The multifilament yarn of the present invention commonly possesses a denier per filament of about 1 to 20 (e.g. about 3 to 10), and commonly consists of about 6 to 600 continuous filaments (e.g. about 20 to 400 continuous filaments). The denier per filament and the number of continuous filaments present in the yarn may be varied widely as will be apparent to those skilled in the art.

The multifilament yarn is particularly suited for use in industrial applications wherein high strength rayon have been utilized in the prior art. The fibers are particularly suited for use in environments where elevated temperatures (e.g. 80° C. to 110° C.) are encountered. Not only does the filamentary material undergo a relatively low degree of shrinkage for a high strength fibrous material, but it provides enhanced treated cord toughness and ultimate elongation.

The unexpected combination of high ultimate elongation and toughness with dimensional stability seems to originate from the emergence of a two-phase structure (crystal plus amorphous) during spinning. At moderate amorphous orientation there is substantial crystallization of the more oriented amorphous regions.

In the conventional PET yarn process, crystallization occurs mainly in the drawing step since orientation in the spinning column is low. In current commercial dimensionally stable yarn processes, there is significant amorphous orientation during spinning but crystallization essentially occurs only in the drawing step. In the present invention, the overall orientation in spinning is sufficient to result in orientated amorphous and crystalline regions. The theoretical analysis of the consequence of crystallization on amorphous-orientation distribution has been discussed by Desai and Abhiraman [J. Polym. Sci., Polym. letters Edition, 23, 213–217 (1985)].

The characterization parameters referred to herein may conveniently be determined by testing the multifilament yarn which consists of substantially parallel filaments.

Birefringence was determined using a polarizing light microscope equipped with a Berek compensator and the fraction crystallinity was determined by conventional density measurements. The amorphous orientation function was determined from the following relationship (see R. J. Samuels, Structured Polymer Properties, New York, John Wiley & Sons).

$$\Delta n = K f_c \Delta n_c + (1-X) f_a \Delta n_a + \Delta n_f$$

where
 $\Delta n$ = birefringence
 $X$ = fraction crystalline
 $f_c$ = crystalline orientation function
 $\Delta n_c$ = intrinsic birefringence of crystal (0.220 for polyethylene terephthalate)
 $f_a$ = amorphous orientation function
 $\Delta n_a$ = intrinsic birefringence of amorphous (0.275 for polyethylene terephthalate)
 $\Delta n_f$ = form birefringence (negligable for this system)

Crystal orientations were determined with Herman's orientation function employing the average angular azimuthal breadth of the (010) and (100) reflections of the wide angle x-ray diffraction pattern:

$$f_c = \tfrac{1}{2}(3\cos^2\phi - 1)$$

where,
 $f_c$ = crystal orientation function
 $\phi$ = average orientation angle Density of the undrawn and drawn yarn is a convenient measure of percent crystallinity. Densities of undrawn and drawn yarns were determined in n-heptane/carbon tetrachloride density gradient column at 23° C. The gradient column was prepared and calibrated according to ASTM D1505-68 with density ranging from 1.30–1.43 g/cm³. Percent, crystallinity was then calculated from $$XTAL\ \% = \frac{\rho s}{\rho c}\left(\frac{\rho s - \rho a}{\rho c - \rho a}\right) \times 100$$

$\rho s$—density of sample in gm/cm³

$\rho a$—density of 100% amorphous phase (1.335 gm/cm$^3$)

$\rho c$—density of 100% crystalline phase (1.529 gm/cm$^3$)

While birefringence and crystallinity measurements are effective for characterizing the amorphous orientation of drawn yarns, undrawn yarn produced near the transition between oriented-amorphous and oriented-crystalline structures demands a more direct method of evaluating degree of orientation in the amorphous phase. For this, wide angle X-Ray diffraction patterns were obtained in the transmission geometry on a Philips diffractometer with Cu radiation and diffracted beam monochromator. Several radial scans were obtained at various azimuthal angles between the equator and the meridian. These scans were resolved into crystalline and amorphous components through a DuPont curve resolver (Gaussian lineshape). The azimuthal half-width at half-height ($\phi\frac{1}{2}$) for the intensity distribution of amorphous halo was determined by plotting the height of amorphous peak as a function of azimuthal angle.

Melting points (M.P.) were determined with a Perkin-Elmer Differential Scanning Calorimeter (DSC) from the maxima of the endotherm resulting from scanning a 2 mg sample at 20° C. per minute. M.P. is taken to be at the maxima of the highest temperature peak of the DSC trace. Melting point elevations ($\Delta$M.P.) cited are defined as the difference between the specimen melting point (M.P.) and the melting point (M.P.Q.) of a specimen after subsequent rapid liquid nitrogen quenching of an encapsulated DSC sample from the melt. The melting point of this re-crystallized sample is due to crystals which have cold-crystallized during the melting point test procedure. The differences in melting point provide a direct quantitative measure of differences in internal morphological structure. It is felt that this unique morphological structure rather than melting point elevation per se gives rise to the desired improved performance. The absolute melting point for PET is influenced by the presence of structural impurities such as ether linkages, comonomers, etc.

Intrinsic viscosity (IV) of the polymer and yarn is a convenient measure of the degree of polymerization and molecular weight. IV is determined by measurement of relative solution viscosity ($\eta_r$) of PET sample in a mixture of phenol and tetrachloroethane (60/40 by weight) solvents. The relative solution viscosity ($\eta_r$) is the ratio of the flow time of a PET/solvent solution to the flow time of pure solvent through a standard capillary. Billmeyer approximation (J. Polym. Sci. 4, 83–86 (1949)) is used to calculate IV according to $$IV = 1/4 \frac{(\eta_r - 1)}{C} + 3/4 \frac{\ln \eta_r}{C}$$

where C is concentration in gm/100 ml. It will be understood that IV is expressed in units of deciliters per gram (dl/g), even when such units are not indicated. The invention makes possible obtaining high modulus, high elongation drawn yarn without the need to utilize exceptionally high IV polymer. Satisfactory drawn yarns with IV of at least 0.80, for example 0.85 to 0.94 can be obtained by this invention.

The tenacity values (i.e. at least 5 grams per denier), compare favorably with these particular parameters exhibited by commercially available rayon tire cord yarns. The tensile properties referred to herein were determined on yarns conditioned for two hours through the utilization of an Instron tensile tester (Model TM) using a 10-inch gauge length and a strain rate of 120 percent per minute in accordance with ASTM D885. All tensile measurements were made at room temperature. The area under the stress-strain curve was utilized to calculate toughness, which is expressed in grams per denier.

Elongation at the specified load of 4.5 g/d ($E_{4.5}$) is inversely related to modulus. It is particularly useful in that the sum $E_{4.5}$+FS is a good indicator of dimensional stability for yarns processed under different relaxation levels. Lower sums ($E_{4.5}$+FS) indicate better dimensional stability. Drawn yarn of the present invention possess a dimensional stability defined by $E4.5$ +FS<11.5%. Free shrinkage (FS) values were determined in accordance with ASTM D885 with the exception that the testing load was 9.0 grams. Such improved dimensional stability is of particular importance if the product serves as fibrous reinforcement in a radial tire.

The Kinetic Theory of Rubber Elasticity allows computation of an effective number of crosslinks in a yarn. These crosslink values are imagined to be a measure of the ability of the crystals to tie together the amorphous regions, either via tie chains or crystal proximity. The relationship of interest is:

$$\sigma = NkT(\lambda^2 - 1/\lambda)$$

where,
$\sigma$=shrinkage force
k=Boltzman constant
T=temperature
$\lambda$=extension ratio=1/(1-shrinkage)
N=network chains or crosslinks/cc The classical method for determining crosslink density is to measure shrinkage force and shrinkage for samples which have been drawn (or relaxed) to different extents. For simplicity, we have developed a method which allows one to determine analogous data by measuring the shrinkage at a variety of constraining forces. For this modified technique, the constraining force corresponds to the shrinkage force. The shrinkage value needed for the effective crosslink calculation is the difference between the shrinkage measured at a given constraining force and the shrinkage measured at a minimal constraining force of 5 grams. Note that since curvature in plots of $\sigma$ versus $\lambda^2 - 1/\lambda$ is exhibited at high shrinkage forces only data up to a shrinkage force of 0.08 g/d should be used for the above computation.

Identified hereafter is a description of a process which has been found to be capable of forming the improved yarn of the present invention. The yarn product claimed hereafter is not to be limited by the parameters of the process which follows.

The melt-spinnable polyester is supplied to an extrusion spinnerette at a temperature above its melting point and below the temperature at which the polymer degrades substantially. The residence time at this stage is kept to a minimum and the temperature should not rise above 325° C., preferably 315° C. The flow curve of molten PET in terms of melt viscosity versus shear rate has been shown to be important for steady-state melt spinning giving uniform individual multifilaments. For a circular spinnerette hole where flow is steady and end-effects are negligible, the apparent shear rate ($\dot{\gamma}$) at the wall of the capillary is given by $$\dot{\gamma} = \frac{4Q}{\pi R^3}$$

where
Q=flow rate through the capillary in m³/sec
R=radius of the capillary in meters.

The extruded filaments then traverse a conventional yarn solidification zone where quench air impinges on the spun yarn thereby freezing in desirable internal structural features and preventing the filaments from fusing to one another. The solidification zone preferably comprises (a) a retarded cooling zone comprising a heated gaseous atmosphere, preferably heated at a temperature of 150° to 450° C., and (b) a cooling zone adjacent said retarded cooling zone wherein said yarn is rapidly cooled and solidified in a blown air atmosphere. The key to the current process is to utilize extruding polymer with IV greater than 0.80, preferably 0.85 and adjust processing conditions to achieve a crystalline, partially oriented yarn with a crystallinity of 16 to 24 percent and a melting point elevation of 14° to 22° C. preferably 17° to 20° C. This makes possible the production of drawn yarn with high modulus and high elongation without the need for solid state polymerization or injecting additives to enhance IV. Thus drawn yarns can be prepared by a simpler process in the range of 0.85 to 0.94 IV yet still have the desired treated cord high elongation for a given modulus. One skilled in the art can achieve this by adjusting the following conditions: length and temperature of an annealing zone adjacent to the spinnerette, diameter of the spinnerette holes, method of blowing the quench, quench air velocity, and drawdown in the quench column. The speed of withdrawal of the yarn from the solidification zone is an important parameter affecting the stress on the spun fiber, and should be adjusted to yield the desired characteristics.

The spun yarn is then drawn between rolls at temperatures above the glass transition temperature (80° C.) to a total draw ratio between 1.2/1 and 2.5/1, preferably to within 85 percent of the maximum draw ratio. This drawing process involves multiple drawing and conditioning steps to achieve a tenacity above 5 grams per denier, and $E_{4.5}+FS$ less than 11.5%.

It will be appreciated by those of skill in the art that the high viscosity polymer spun as above can be drawn in known ways such as that disclosed in U.S. Pat. No. 4,195,052 to Davis et al. and in U.S. Pat. No. 4,251,481 to Hamlyn. The yarn can be drawn off-line. However, for economic reasons it is preferred to draw the yarn in a continuous integrated spin-draw process.

The drawn yarns are usually twisted into a cord and then dipped into one or more conventional adhesive coatings, referred to as cord dips and then subjected to various stretch/relax sequences at elevated temperature to achieve the optimum combination of properties. Again this technology is well-known to those skilled in the art who adjust twist and treating conditions for specific end-uses. Details for the treating conditions employed are given in the examples.

In evaluating the potential of tire yarns as treated cords, one may use a "standard" twist and cord treatment for comparative purposes. In this "standard" procedure, 1000 denier yarns are twisted to 8 turns per inch and then three ply cords are prepared again using 8 turns per inch. The cords are then dipped in an aqueous blocked diisocyanate (6 percent solids) just prior to passage through a hot air oven at 440° F. (227° C.) for 40 seconds where the cord was stretched 6 or 8 percent. The emerging cord then passes through an RFL dip (20 percent solids) and finally through a second oven at 440° F. for 60 seconds where the cord was relaxed to varying degrees to cover the range where 4 percent free shrinkage is achieved. For less dimensionally stable cord controls, some extrapolation to 4 percent shrinkage may be necessary. The cord is wound on a bobbin for further testing. A single-end Litzler Computreater was used.

Treated cords prepared in such manner from the yarn of this invention have been shown to have the following treated cord properties:

(a) a dimensional stability defined by LASE-5 of at least 3.0, preferably 3.3 to 4.3 grams per denier at 4 percent free shrinkage, (b) a tenacity of at least 4.5, preferably 5.0 to 6.5 grams per denier at 4 percent free shrinkage, said dimensional stability and said tenacity being determined by interpolation of LASE-5 versus free shrinkage data to 4 percent free shrinkage, and (c) Ω (defined below) of at least 75, preferably 80 to 100.

The unique combination of dimensional stability and ultimate elongation of treated cords prepared from yarns of this invention can be quantified by parameter Ω:

$$\Omega = 16((LASE\text{-}5)-1) + UE + 100FS$$

The above expression is defined such that it is highest for high elongation, dimensionally stable cords and such that it is independent of the stretch conditions employed during tensilization.

Additionally, it has been found possible to use a polymer with an IV of 0.85 to 0.94 and still obtain treated cord UE of 15% or greater while maintaining a LASE-5 of at least 3.0 grams per denier.

EXAMPLE I

A 1000 denier PET yarn was produced by extruding 300 individual filaments at 62.5 lbs/hr into a heated sleeve (300° C. Temp) and then solidifying in an air quenching column. Yarns were then taken-up at varying winder speeds. The residence times in the heated sleeve and quench columns were 0.02 to 0.03 and 0.2 seconds, respectively. The godet speed at the bottom of the spinning column and the winder speed were adjusted to give different undrawn birefringences and crystallinity levels. In all cases the same shear rate in the spinnerette holes was employed. Yarn intrinsic viscosity was 0.88.

These undrawn yarns were then drawn in three stages on a draw-winder. The first three godet rolls had temperatures of 120°, 120°, and 230° C., the last godet was ambient. The residence times were 0.7, 0.6–0.7, 0.3–0.6, and 0.2–0.4 seconds. Yarn draw ratios and specific properties are given in Tables I and II.

The above drawn yarns were then twisted into 1000/3, 8×8 tpi cords and two-zone treated at 440° F. (227° C.) and 440° F. (227° C.) for 40 and 60 seconds. Aqueous blocked diisocyanate and RFL dips were applied prior to the two hot zones, respectively. The treated cords were prepared using +6 percent stretch in the first zone and various relaxations (−4, −2, and 0 percent) in the second zone. Stretching sequences of +1, 0 and +8, 0 percent were also used. The properties of these cords are given in Table III. It is readily obvious that the example of this invention (I-DT) has much higher dimensional stability and combination of dimensional stability and ultimate elongation as measured by $\Omega$ than the comparative examples, even though it was somewhat over drawn resulting in some reduction in ultimate elongation. The tenacity of 5.6-6.0 g/d at 4 percent FS is quite adequate when compared to rayon. For the drawn yarn sample representing this invention (I-DD Table II), $E_{4.5}+FS$ is 7.9 percent. This sum would have been slightly higher (2-3 percent) if the yarn was draw at higher speeds where residence time on heated rolls were lower. Note the melting point (267° C.) lies above that for comparative examples (I-AD, −BD, and −CD). Also note that the spinning speed required to achieve the 0.088 undrawn birefringence is less than that for the prior art U.S. Pat. No. 4,491,657.

EXAMPLE II

A higher viscosity yarn (IV=0.92) was spun under similar conditions as in Example I except that several spinnerette shear rates were used. Following the same procedure as in Example I, the winder speed was adjusted to provide different undrawn crystallinities. This undrawn yarn was continuously transported to the panel draw rolls. Details for the undrawn and drawn yarns are given in Tables IV and V. The residence times on the draw rolls was 0.05 to 0.1 second.

Figure 1:
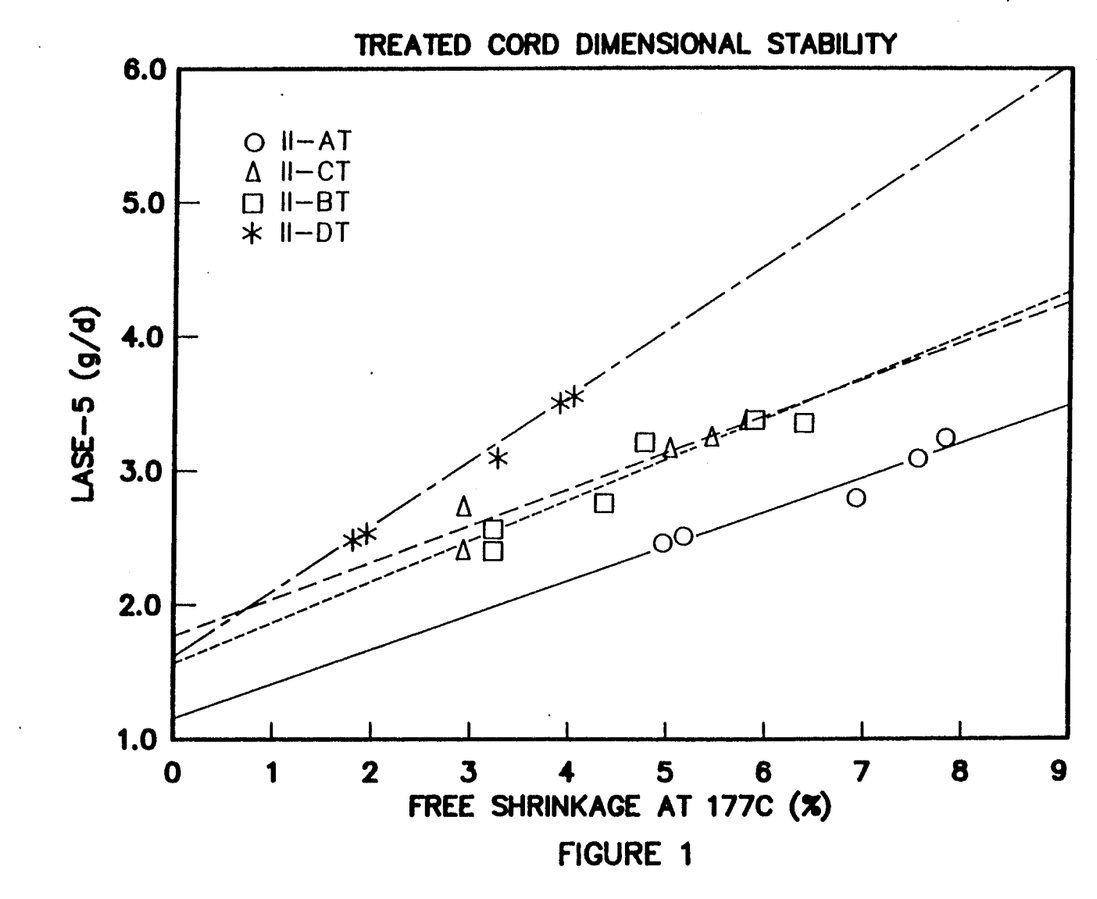
FIG. 1 represents treated cord dimensional stability as judged by plots of LASE-5 versus free shrinkage for the yarns prepared in Example 2.
Figure 2:
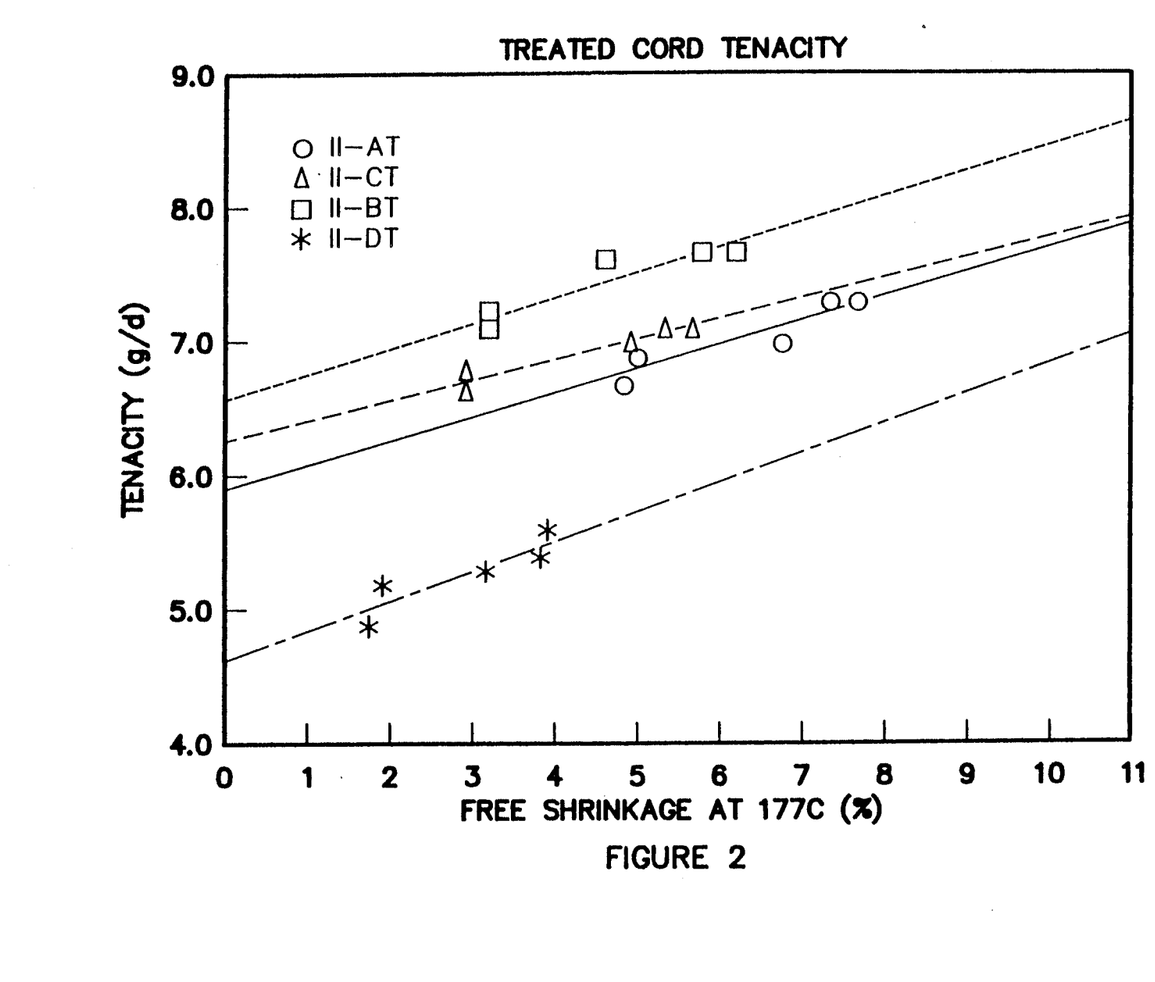
FIG. 2 represents a comparison of treated cord tenacities at a given free shrinkage for the yarns of Example 2.

The preceeding drawn yarns were then twisted into a 1000/3, 8×8 tpi cord and then treated per Example I. Again treated cord dimensional stability (Table VI and FIG. 1) increased with undrawn crystallinity. For ease of comparison, interpolated treated cord physical properties are compared in Table VII at a given LASE-5 (3.0g/d). This clearly indicates that when treating to a given modulus, specifically LASE-5, the yarn of this invention unexpectedly has exceptional toughness and high ultimate elongation. Thus, one gets combinations of improved toughness and higher LASE-5. This unique combination of properties can readily be expressed in terms of $\Omega$ of at least 75. An improvement in fatigue resistance is anticipated for the example of this invention.

Figure 3:
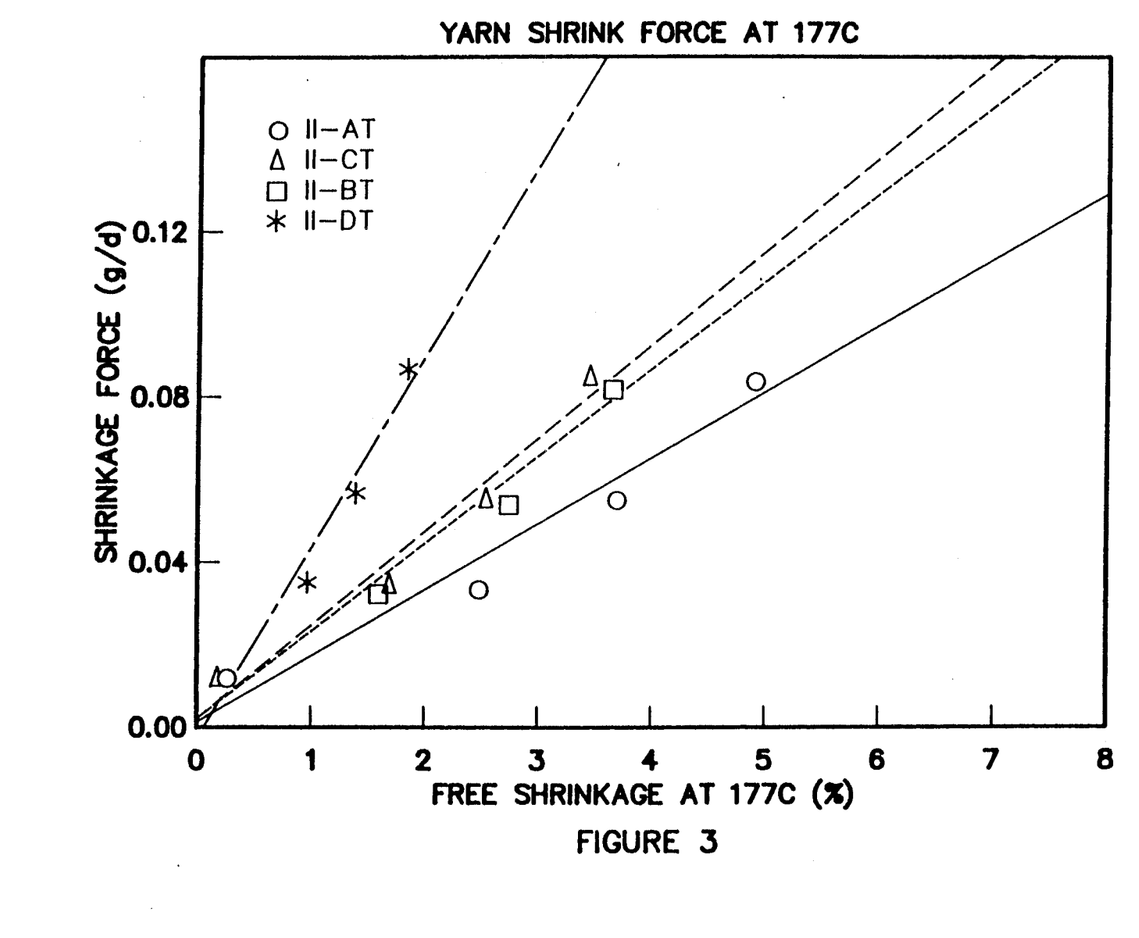
FIGS. 3 & 4 gives the shrink-force versus shrinkage curve for comparative and representative samples.
Figure 4:
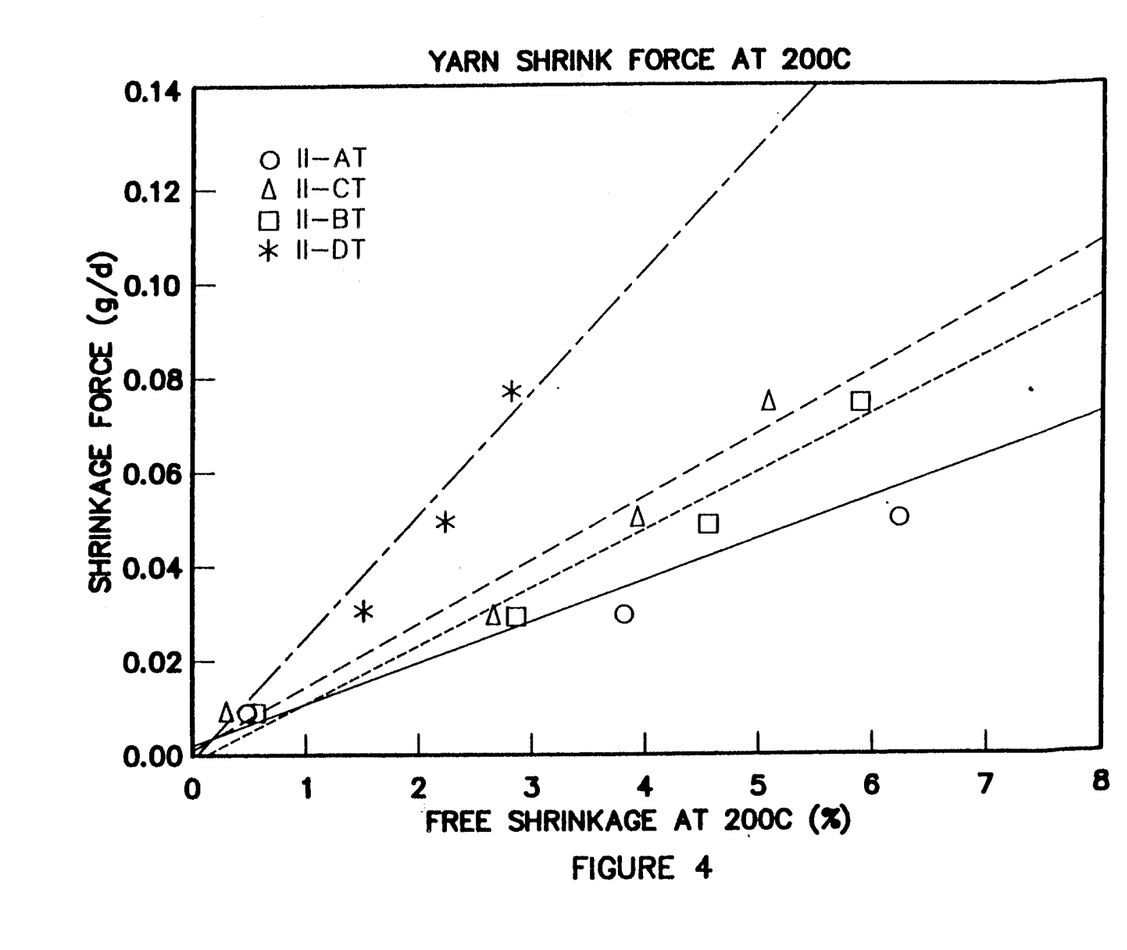
Figure 5:
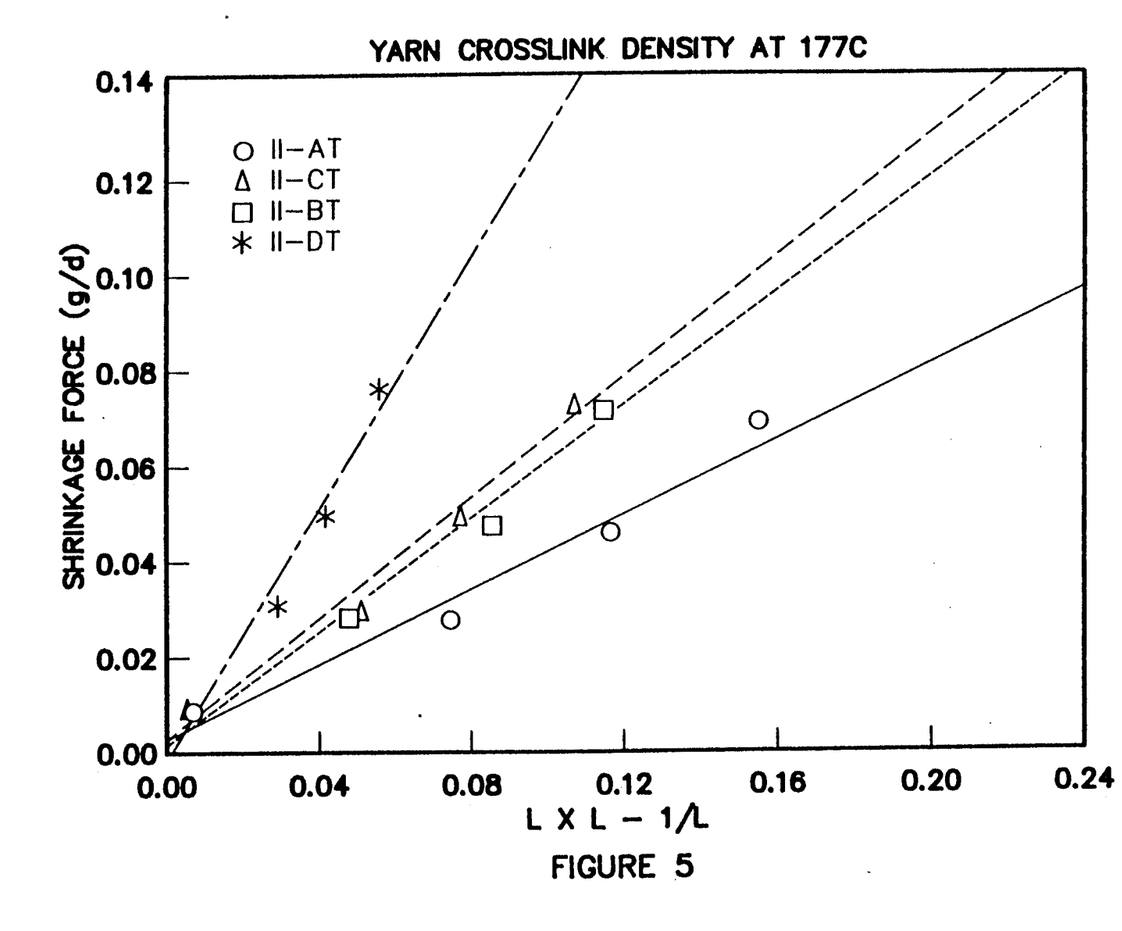
FIG. 5 gives the relation of shrink-force and deformation defined as $\lambda^2 - 1/\lambda$ to provide the estimate of yarn crosslink density.

The drawn yarn (II-DD) of this invention has tenacity of 5.8 g/d, $E_{4.5}+FS$ of 10.8 percent, melting point of 269° C., and low amorphous orientation. As shown in FIG. 3 and 4, the yarn of this invention has an exceptionally high shrink-force for its low shrinkage. This corresponds to an effective crosslink density of 26.6 $\times 10^{21}$ crosslinks/cc, which is substantially above the values for samples representing prior art. FIG. 5 gives the plot from which the crosslink density was calculated.

After correcting for property losses due to raising the temperature to 110° C., the properties for a typical rayon treated cord and the sample representing this invention are compared in Table VIII. This clearly shows that even for the lower tenacities associated with this invention, these cords still represent a viable rayon replacement.

Again note that the spinning speeds required are much less than those taught in U.S. Pat. No. 4,491,657. This lower speed allows preparation of fibers in a continuous spin-draw process without the need for expensive high speed equipment.

TABLE I

| | UNDRAWN YARN (IV = 0.88) | | | | | | |
|---|---|---|---|---|---|---|---|
| Example | Spinning Speed m/min | Spinnerette Shear Rate, Sec$^{-1}$ | $\Delta$ N | M.P., °C. | $\Delta$ M.P. | Density, g/cm$^3$ | XTAL, % |
| I-A | 1760 | 2150 | 0.028 | 250 | 1 | 1.3385 | 2 |
| I-B, I-C | 2900 | 2150 | 0.056 | 252 | 3 | 1.3480 | 4 |
| I-D | 3500 | 2150 | 0.088 | 261 | 12 | 1.3701 | 18 |

TABLE II

| | DRAWN YARN (IV = 0.88) | | | | | | | | | | | | |
|---|---|---|---|---|---|---|---|---|---|---|---|---|---|
| | Draw Ratio | | | | Tenacity | LASE-5 | Terminal Mod. | $E_{4.5}$, | UE, | FS (%), | $E_{4.5}$, + FS, | M.P., | |
| Example* | 1 | 2 | 3 | Denier | g/d | g/d | g/d | % | % | @ 177° C. | % | °C. | $\Delta$ M.P.$^a$ | Fa |
| I-AD | 1.72 | 1.38 | 1.03 | 1016 | 7.8 | 4.1 | 128 | 5.2 | 9.8 | 9.0 | 14.2 | 257 | 8 | 0.73 |
| I-BD | 1.72 | 1.10 | 1.04 | 898 | 7.8 | 5.4 | 111 | 4.1 | 7.2 | 6.1 | 10.2 | 258 | 9 | 0.71 |
| I-CD | 1.72 | 1.10 | 0.98 | 943 | 7.0 | 4.0 | 54 | 4.6 | 8.9 | 5.5 | 10.1 | 259 | 10 | 0.70 |
| I-DD | 1.40 | 1.10 | 1.05 | 799 | 6.5 | 5.8 | 78 | 3.2 | 6.2 | 4.7 | 7.9 | 267 | 18 | 0.68 |

*I-AD signifies undrawn I-A after drawing, and so on.
$^a$M.P. for melted, quenched, and remelted fiber was 249° C.

TABLE III

| | TREATED CORD PROPERTIES (IV = 0.88) | | | | | | |
|---|---|---|---|---|---|---|---|
| Example* | Stretch | Tenacity, g/d | LASE-5, g/d | FS (%), at 177° C. | UE, % | Toughness, g/d | $\Omega$ |
| I-AT | +6/−4 | 6.0 | 2.48 | 4.8 | 11.7 | 0.34 | 54 |
| | +6/−2 | 6.0 | 2.62 | 5.4 | 11.5 | 0.34 | 56 |
| | +6/0 | 6.0 | 3.01 | 6.7 | 10.1 | 0.30 | 57 |
| | +8/0 | 6.0 | 2.95 | 7.0 | 9.7 | 0.29 | 55 |
| I-BT | +6/−4 | 6.6 | 2.70 | 4.2 | 13.6 | 0.50 | 65 |
| | +6/−2 | 6.7 | 3.34 | 6.3 | 11.6 | 0.44 | 67 |
| | +6/0 | 6.7 | 3.46 | 6.7 | 10.6 | 0.38 | 65 |
| | +8/0 | 7.0 | 3.50 | 6.8 | 11.0 | 0.42 | 66 |
| I-CT | +6/−4 | 6.3 | 2.20 | 2.6 | 16.1 | 0.59 | 74 |
| | +6/−2 | 6.3 | 2.64 | 3.7 | 14.4 | 0.53 | 68 |
| | +6/0 | 6.5 | 2.99 | 4.6 | 13.3 | 0.50 | 67 |

TABLE III-continued

TREATED CORD PROPERTIES (IV = 0.88)

| Example* | Stretch | Tenacity, g/d | LASE-5, g/d | FS (%), at 177° C. | UE, % | Toughness, g/d | Ω |
|---|---|---|---|---|---|---|---|
| | +8/0 | 6.4 | 3.08 | 4.8 | 13.3 | 0.51 | 67 |
| I-DT | +6/−4 | 5.8 | 3.77 | 3.3 | 10.2 | 0.36 | 85 |
| | +6/−2 | 5.6 | 3.58 | 3.2 | 11.2 | 0.39 | 84 |
| | +6/0 | 5.6 | 3.87 | 3.9 | 10.9 | 0.39 | 82 |
| | +8/0 | 6.0 | 4.00 | 4.1 | 9.1 | 0.31 | 81 |

*Undrawn I-A after drawing and treating is I-AT and so on.

TABLE IV

UNDRAWN YARN (IV = 0.92)

| Example | Spinning Speed m/min | Spinnerette Shear Rate, Sec$^{-1}$ | Δ N | M.P., °C. | Δ M.P. | Density, g/cm$^3$ | XTAL, % | Φ ½ (deg) |
|---|---|---|---|---|---|---|---|---|
| II-A | 1760 | 2150 | 0.026 | 249 | 0 | 1.3430 | 3 | 21 |
| II-B | 2020 | 910 | 0.055 | 252 | 3 | 1.3494 | 7 | 32 |
| II-C | 2420 | 980 | 0.069 | 253 | 4 | 1.3603 | 13 | — |
| II-D | 2990 | 640 | 0.082 | 265 | 16 | 1.3707 | 18 | 19 |

TABLE V

DRAWN YARN (IV = 0.92)

| Example* | Draw Ratio 1 | 2 | 3 | Denier | Tenacity g/d | Lase-5 g/d | Terminal Modulus g/d | $E_{4.5}$, % | UE, % | Free Shrink, @ 177° C. | $E_{4.5}$, + FS, % | M.P., °C. | Δ M.P.$^a$ | Fa | N$^b$ |
|---|---|---|---|---|---|---|---|---|---|---|---|---|---|---|---|
| II-AD | 1.73 | 1.46 | 0.98 | 1008 | 8.1 | 3.9 | 95 | 5.5 | 10.0 | 10.0 | 15.5 | 256 | 7 | 0.70 | 8.4 |
| II-BD | 1.73 | 1.25 | 0.99 | 1007 | 8.1 | 4.0 | 128 | 5.5 | 9.9 | 7.4 | 12.9 | 258 | 10 | 0.66 | 11.6 |
| II-CD | 1.73 | 1.16 | 1.00 | 982 | 7.3 | 3.9 | — | 5.7 | 10.0 | 5.8 | 11.5 | 259 | 10 | 0.64 | — |
| II-DD | 1.40 | 1.15 | 1.00 | 924 | 5.8 | 4.1 | 78 | 6.5 | 16.5 | 4.3 | 10.8 | 269 | 20 | 0.58 | 26.6 |

*II-AD signifies undrawn I-A after drawing, and so on
$^a$Melting Point for melted, quenched, and remelted fiber was 249° C.
$^b$10$^{21}$ Crosslinks per cc

TABLE VI

TREATED CORD PROPERTIES (IV = 0.92)

| Example | Stretch | Tenacity, g/d | LASE-5, g/d | FS (%), at 177° C. | UE, % | Toughness g/d | Ω |
|---|---|---|---|---|---|---|---|
| II-AT | +1/0 | 6.7 | 2.43 | 4.9 | 15.0 | 0.50 | 58 |
| | +6/−4 | 6.9 | 2.50 | 5.1 | 13.7 | 0.47 | 57 |
| | +6/−2 | 7.0 | 2.80 | 6.9 | 11.5 | 0.40 | 55 |
| | +6/0 | 7.3 | 3.08 | 7.5 | 11.1 | 0.41 | 58 |
| | +8/0 | 7.3 | 3.24 | 7.8 | 11.0 | 0.40 | 60 |
| II-BT | +1/0 | 7.1 | 2.41 | 3.2 | 16.4 | 0.62 | 70 |
| | +6/−4 | 7.2 | 2.55 | 3.2 | 16.1 | 0.61 | 72 |
| | +6/−2 | 7.6 | 3.20 | 4.7 | 14.9 | 0.60 | 71 |
| | +6/0 | 7.7 | 3.39 | 5.9 | 13.3 | 0.56 | 68 |
| | +8/0 | 7.7 | 3.37 | 6.3 | 12.6 | 0.53 | 66 |
| II-CT | +1/0 | 6.6 | 2.40 | 2.9 | 16.3 | 0.61 | 73 |
| | +6/−4 | 6.8 | 2.73 | 3.9 | 16.1 | 0.62 | 69 |
| | +6/−2 | 7.0 | 3.16 | 5.0 | 13.9 | 0.57 | 69 |
| | +6/0 | 7.1 | 3.24 | 5.4 | 13.0 | 0.50 | 67 |
| | +8/0 | 7.1 | 3.36 | 5.8 | 12.6 | 0.50 | 68 |
| II-DT | +1/0 | 4.9 | 2.50 | 1.8 | 18.9 | 0.66 | 98 |
| | +6/−4 | 5.2 | 2.56 | 1.9 | 18.5 | 0.64 | 96 |
| | +6/−2 | 5.3 | 3.14 | 3.2 | 16.9 | 0.64 | 82 |
| | +6/0 | 5.4 | 3.53 | 3.9 | 15.2 | 0.59 | 81 |
| | +8/0 | 5.6 | 3.60 | 4.0 | 14.1 | 0.53 | 81 |

TABLE VII

TREATED CORD PROPERTIES

| | II-AT | II-BT | II-DT |
|---|---|---|---|
| Tenacity(g/d) | 7.1 | 7.1 | 5.1 |
| LASE-5 (g/d) | 3.0 | 3.0 | 3.0 |
| UE (%) | 11.5 | 14.7 | 16.5 |
| Tough (g/d) | 0.40 | 0.59 | 0.64 |
| FS (%) | 7.0 | 4.5 | 2.9 |
| Ω | 58 | 69 | 83 |

TABLE VIII

TREATED CORD PROPERTIES

| | Rayon | II-CT (comparative) | II-DT |
|---|---|---|---|
| Tenacity at 110° C., g/d | 3.5 | 6.4 | 5.0 |
| LASE-5 at 110° C., g/d | 1.2 | 2.0 | 2.4 |
| Free Shrinkage, 177° C., % | 1 | 4 | 4 |

What is claimed is:

1. A drawn polyethylene terephthalate multifilament yarn having the following combination of properties:

(A) a terminal modulus of at least 20 g/d,
(B) a dimensional stability defined by the sum of elongation at 4.5 g/d load and free shrinkage after 1 minute in 177° C. dry air of less than 11.5%,
(C) a tenacity of at least 5 grams/denier,
(D) a melting point elevation of 14° to 22° C., and
(E) an amorphous orientation function of less than 0.75.

2. The drawn yarn of claim 1 wherein the melting point elevation is 17° to 20° C.

3. The drawn yarn of claim 1 wherein the intrinsic viscosity is 0.85 to 0.95 dl/g.

4. Yarn of claim 1 which has an effective crosslink density of at least $18 \times 10^{21}$ crosslinks/cc.

5. A high tenacity, dimensionally stable treated tire cord prepared from the yarn of claim 1.

6. A tire incorporating as reinforcing material the high tenacity, dimensionally stable cord of claim 1.

7. A drawn polyethylene terephthalate yarn which, when twisted into an 8×8 twists per inch 1000 denier 3-end greige cord and tensilized by the sequence of dipping into a first blocked diisocyanate dipping solution, stretching at 440° F. (227° C.) for 40 seconds, dipping into a second resorcinol-formaldehyde-latex dipping solution, and relaxing at 440° F. (227° C.) for 60 seconds, provides the following treated cord property combinations:

(a) a dimensional stability defined by a load at 5% elongation (LASE-5) of at least 3.0 grams per denier at 4 percent free shrinkage after 1 minute in 177° C. dry air, and
(b) a tenacity of at least 4.5 grams per denier at 4 percent free shrinkage, said dimensional stability and said tenacity being determined by interpolation of LASE-5 versus free shrinkage data to 4 percent free shrinkage, and
(c) $\Omega$ of at least 75, where $\Omega = 16((\text{LASE-5})-1) + \text{ultimate elongation (in \%)} + 100/\%$ free shrinkage after 1 minute in 177° C. dry air, with LASE-5 expressed in grams per denier.

8. The drawn yarn of claim 7 with an intrinsic viscosity of 0.85 to 0.94 dl/g which provides a treated cord ultimate elongation of at least 15%.

9. The drawn yarn of claim 7 with an intrinsic viscosity of 0.85 to 0.94 dl/g which provides the following treated cord property combinations:
(a) a dimensional stability defined by LASE-5 of 3.3 to 4.3 grams per denier at 4 percent free shrinkage,
(b) a tenacity of 5.0 to 6.5 grams per denier at 4 percent free shrinkage, and
(c) $\Omega$ of 80 to 100.

10. A composite incorporating as reinforcing material the drawn yarn of claim 1.

* * * * *